US007343785B2

(12) United States Patent
Ono et al.

(10) Patent No.: US 7,343,785 B2

(45) Date of Patent: Mar. 18, 2008

(54) SIGNAL DETECTOR OF ENGINE FOR VEHICLE

(75) Inventors: Takahiro Ono, Hyogo (JP); Yoshio Okada, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/276,087

(22) Filed: Feb. 14, 2006

(65) Prior Publication Data

US 2006/0185427 A1 Aug. 24, 2006

(30) Foreign Application Priority Data

Feb. 21, 2005 (JP) .......................... P2005/044102

(51) Int. Cl.
*G01M 19/00* (2006.01)

(52) U.S. Cl. .................................................... 73/118.1

(58) Field of Classification Search .................. 73/116, 73/117.3, 118.1

See application file for complete search history.

(56) References Cited

U.S. PATENT DOCUMENTS 6,405,846 B1 * 6/2002 Reik et al. ............. 192/70.252

7,004,135 B2 * 2/2006 Tsutsumi et al. ...... 123/179.24

FOREIGN PATENT DOCUMENTS

JP 8-086223 4/1996

* cited by examiner

*Primary Examiner*—Michael Cygan
*Assistant Examiner*—Octavia Davis
(74) *Attorney, Agent, or Firm*—Wenderoth, Lind & Ponack, L.L.P.

(57) ABSTRACT

Disclosed is a vehicle engine in which a crankcase is reduced in length in a crankshaft direction and in which the number of parts for an ignition signal detecting device is reduced, whereas rigidity and function of a one-way clutch for a starter mechanism is maintained. The one-way clutch is mounted on one end of a crankshaft, and a sensor of the ignition signal detecting device is positioned radially outside a cylindrical outer wall of a clutch outer component of the one-way clutch. The cylindrical outer wall of the clutch outer component includes a plurality of concave and convex parts as a signal output part in its circumferential direction, where each of the concave and convex parts extends in the crankshaft direction. The cylindrical outer wall includes an annular reinforced part having a thickness which is greater than that of a bottom wall forming the concave part.

12 Claims, 7 Drawing Sheets

SIGNAL DETECTOR OF ENGINE FOR VEHICLE

BACKGROUND OF THE INVENTION

1. Field of the Invention

The present invention generally relates to a signal detector of an engine for a vehicle, and particularly relates to a signal detector which is suitable for the engine for a two-wheeled motor vehicle having a starter.

2. Description of the Related Art

In an engine for a two-wheeled motor vehicle, it is preferable to mount a one-way clutch for a starter mechanism on a crankshaft in order to reduce a mechanical loss of power for starting the engine. Therefore, the one-way clutch is generally mounted on an end of the crankshaft. In addition to the one-way clutch, a generator rotor, a pulser rotor for outputting pulse signals for ignition signals, and the like, a sprocket for cam drive, and so on, are mounted on ends of the crankshaft, separately.

As one example of a common arrangement, the sprocket for cam drive is mounted on one end of the crankshaft, and the generator is mounted on the other end of the crankshaft, where the one-way clutch for the starter mechanism is mounted in juxtaposition with the generator on the other end.

According to the arrangement in which the generator and the one-way clutch are mounted in juxtaposition with each other on the other end of the crankshaft longitudinally, however, the generator projects outwardly in the longitudinal direction, and therefore it is necessary to increase the width of the crankcase (namely, the length of the crankshaft). Particularly, if the two-wheeled motor vehicle is equipped with a plurality of cylinders (for example, four cylinders) in juxtaposition in the direction of the crankshaft, and if the generator projects outwardly in the longitudinal direction, it is not possible to take a large bank angle.

There has also been provided an engine, as shown in FIG. 10, in which the one-way clutch 102 for the starter mechanism 101 is mounted on an end of the crankshaft 105 opposite an end thereof on which the generator 103 is mounted in order to diminish the projection of the generator, as disclosed in Japanese Laid-Open Patent Publication No. 8-86223. That is, in the engine shown in FIG. 10, the sprocket 110 for cam drive, the pulser rotor 111 and the one-way clutch 102 for the starter mechanism 101 are all mounted on the same end of the crankshaft 105, and a rotor 103*a* of the generator 103 is mounted on the other end of the crankshaft 105. There is arranged a sensor (for example, pulser coil) 112 for signal detection radially outside the pulser rotor 111, and the sensor 112 is mounted on the starter cover 115.

Also in the arrangement in which the one-way clutch 102 is mounted on the one end of the crankshaft 105 opposite the other end thereof on which the generator 103 is mounted as shown in FIG. 10, however, the pulser rotor 111, the sprocket 110 for cam drive and the one-way clutch 102 are all mounted in juxtaposition on the same end of the crankshaft 105. Namely, with this arrangement, it is difficult to make the dimension of the crankcase 120 in the direction of the crankshaft 105 smaller.

SUMMARY OF THE INVENTION

Therefore, it is an object of the present invention to provide a signal detector of an engine for a vehicle which makes the crankcase compact in the longitudinal direction of the crankshaft and reduces the number of component parts for the signal detector such as a signal detector for detecting ignition signals.

In accomplishing this and other objects of the present invention, there is provided a signal detector of an engine for a vehicle, in which the engine has a one-way clutch, for a starter mechanism of the engine, which is mounted on one end of a crankshaft of the engine, the signal detector comprising: a clutch outer member of the one-way clutch; and a sensor for detecting signals, in which the sensor is provided radially outside a cylindrical outer wall of the clutch outer member so as to be opposed to the cylindrical outer wall, wherein the cylindrical outer wall of the clutch outer member has: an outer surface having a concavity and convexity as a signal output part which is detected by the sensor; and an annular reinforced part which is thicker than a bottom surface of the concavity of the signal output part.

According to this construction, the signal output part for outputting pulse signals for an ignition system, and the like, is directly formed on the cylindrical outer wall of the clutch outer member. Therefore, there is no need of providing a separate, or independent, additional rotational member for the exclusive use of outputting the signals like the conventional pulse rotor mounted on the crankshaft. That is, with this construction, it is possible to reduce the total number of component parts for the signal detector, to reduce the weight of parts which are mounted on the crankshaft of the engine, and to downsize the crankcase of the engine in the direction in which the crankshaft extends.

Also, according to this construction, since the signal output part is formed on the outer surface of the clutch outer member, it is possible to make the width of the signal output part larger than that of the conventional disk-shaped pulser rotor. Thereby, the ability and performance to detect the signals is enhanced, and the leak of detection of the signals is effectively prevented.

When the clutch is engaged, a load is exerted outwardly upon the cylindrical outer wall of the clutch outer member by a clutch element (or clutch component) which is arranged inside the cylindrical outer wall. According to the construction, since the cylindrical outer wall of the clutch has the annular reinforced part which is formed thicker than the bottom surface of the concavity of the signal output part, the rigidity (or stiffness) of the cylindrical outer wall of the clutch outer member is maintained. Namely, with this construction, the deformation of the cylindrical outer wall is lessened upon the clutch engagement, and the performance of the one-way clutch is maintained.

In the construction, preferably, the annular reinforced part is provided on an open side of the cylindrical outer wall of the clutch outer member.

Namely, a part of the cylindrical outer wall of the clutch outer member which is most easily deformed by the load exerted with the clutch member, is the open side of the cylindrical outer wall. According to the construction, since the open side of the cylindrical outer wall is provided with the annular reinforced part, such a deformation of the cylindrical outer wall is effectively reduced and suppressed.

In the construction, preferably, the sensor and a supporter for supporting a wire lead for the sensor are mounted on one of a crankcase of the engine and a cover mounted on the crankcase for the starter mechanism.

According to this construction, there is no trouble of arranging the wire lead(s) for the sensor when the cover is attached to, or removed from, the crankcase, in comparison with the conventional construction in which the sensor and the supporter are mounted to the crankcase and the cover, separately. Namely, with this construction, the assemblage and maintenance thereof become easy.

BRIEF DESCRIPTION OF THE DRAWINGS

This and other objects and features of the present invention will become clear from the following description taken in conjunction with a preferred embodiment thereof with reference to the accompanying drawings.

DETAILED DESCRIPTION OF THE PREFERRED EMBODIMENT

Figure 1:
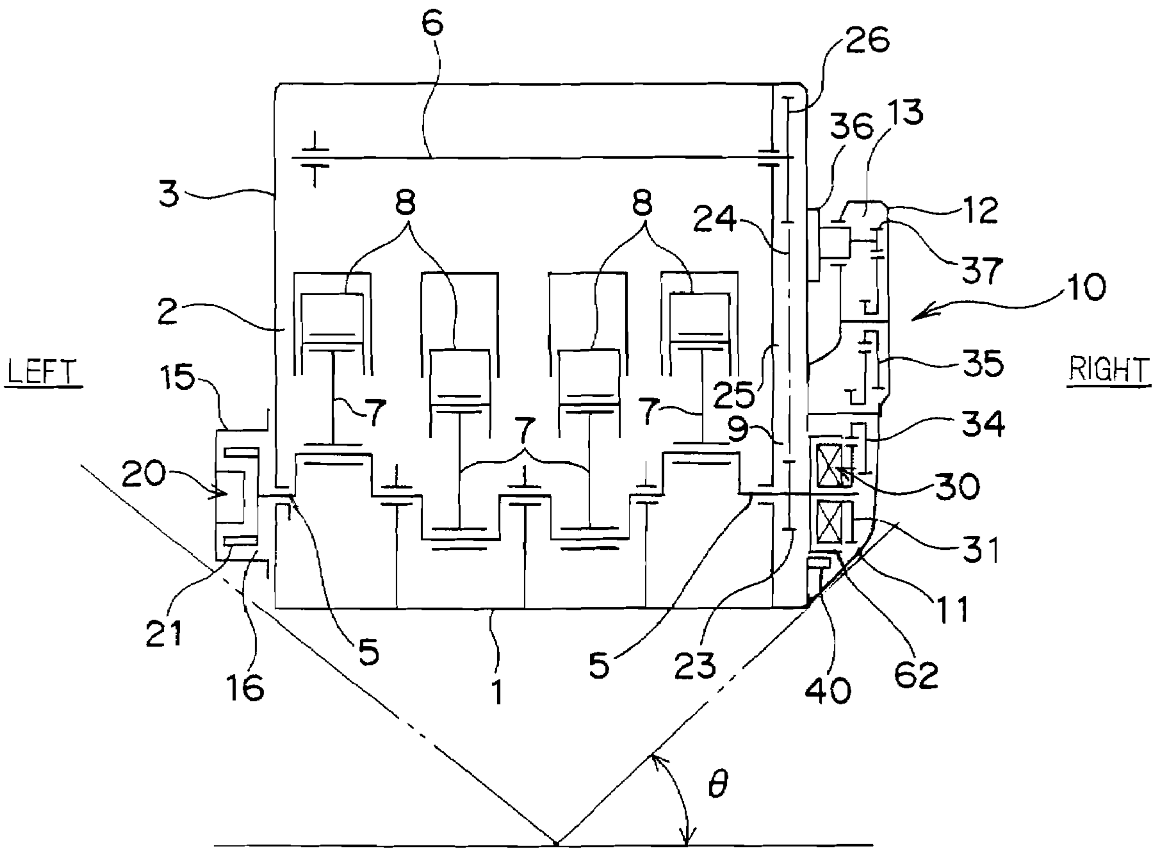
FIG. 1 is a vertical schematic sectional view of an engine for a two-wheeled motor vehicle to which the preferred embodiment of the present invention applies.

Before a description of a preferred embodiment of the present invention proceeds, it is to be noted that like or corresponding parts are designated by like reference numerals throughout the accompanying drawings.

First, with reference to FIGS. 1 through 6, the description is made below of an inline four-cylinder engine for a two-wheeled motor vehicle to which the preferred embodiment of the present invention applies.

Namely, as shown in FIG. 1 which illustrates a whole of the engine as a vertical sectional view thereof, the engine has a crankcase 1, four cylinders 2, a cylinder head 3, and so on. A crankshaft 5 is rotatably supported by the crankcase 1, and a cam shaft 6 for driving an intake valve (not shown) and an exhaust valve (not shown) for each cylinder 2 is rotatably supported by the cylinder head 3. The crankshaft 5 is connected to each piston 8 through each connecting rod 7.

A cam-chain chamber 9 is formed on one side (namely, the right side in FIG. 1) of the crankcase 1 corresponding to one end of the crankshaft 5 in the longitudinal direction of the crankshaft 5, and a first cover 11 and a second cover 12 for a starter mechanism 10 are mounted on the crankcase 1 on the one side. In the arrangement, a starter chamber 13 is formed inside the first cover 11 and the second cover 12.

Meanwhile, a generator cover 15 is mounted on the other side (namely, the left side in FIG. 1) of the crankcase 1 corresponding to the other end of the crankshaft 5 in the longitudinal direction of the crankshaft 5, and a generator chamber 16 is formed inside the generator cover 15. A generator 20 is housed inside the generator chamber 16, and the other end of the crankshaft 5 projects inside the generator chamber 16. In the arrangement, a generator rotor 21 is fixed to the other end of the crankshaft 5.

Hereinafter, the "longitudinal direction of the crankshaft 5" is also referred to as "crankshaft longitudinal direction", the "one side" of the crankcase 1 is also referred to as "right side", and the "other side" of the crankcase 1 is also referred to as "left side", for simplicity and convenience. Incidentally, the "one side" and the "left side" correspond to those, respectively, viewed from a rider of the two-wheeled motor vehicle, as shown in FIG. 1.

As shown in the figure, the one end of the crankshaft 5 projects so as to pass through the cam-chain chamber 9 and extends up to the inside of the starter chamber 13. A sprocket 23 for driving the cam shaft 6 is integrally formed with a part of the crankshaft 5, the part being inside the cam-chain chamber 9. A cam-chain 24 extends between the sprocket 23 and a sprocket 26 which is fixed to the cam shaft 6 for driving the intake and exhaust valves, so as to be wound around both of the sprockets 23 and 26, where the cam-chain 24 passes through the cam-chain chamber 9 inside the crankcase 1, and through a cam-chain chamber 25 of the cylinder 2 and cylinder head 3.

Inside the starter chamber 13, a one-way clutch 30 for the starter mechanism 10 and a starter gear 31 are mounted on the one end of the crankshaft 5. Above the starter gear 31, there are arranged a first idler gear 34, a second idler gear 35, and an output pinion gear 37 of a starter motor 36 which is mounted on the crankcase 1, in this order. That is, the one-way clutch 30, the starter gear 31, the first idler gear 34, the second idler gear 35, the output pinion gear 37, and the starter motor 36 form the starter mechanism 10. There is also arranged a sensor 40 for detecting pulse signals for an ignition system, radially outside the one-way clutch 30, as a signal detector for detecting the pulse signals. As the sensor 40, a magnetic sensor such as a pulser coil, etc. is employed in the embodiment. Alternatively, it is also possible to employ another type of sensor, such as an optical sensor making use of a light-receiving element, a sensor making use of sounds, and so on.

Figure 2:
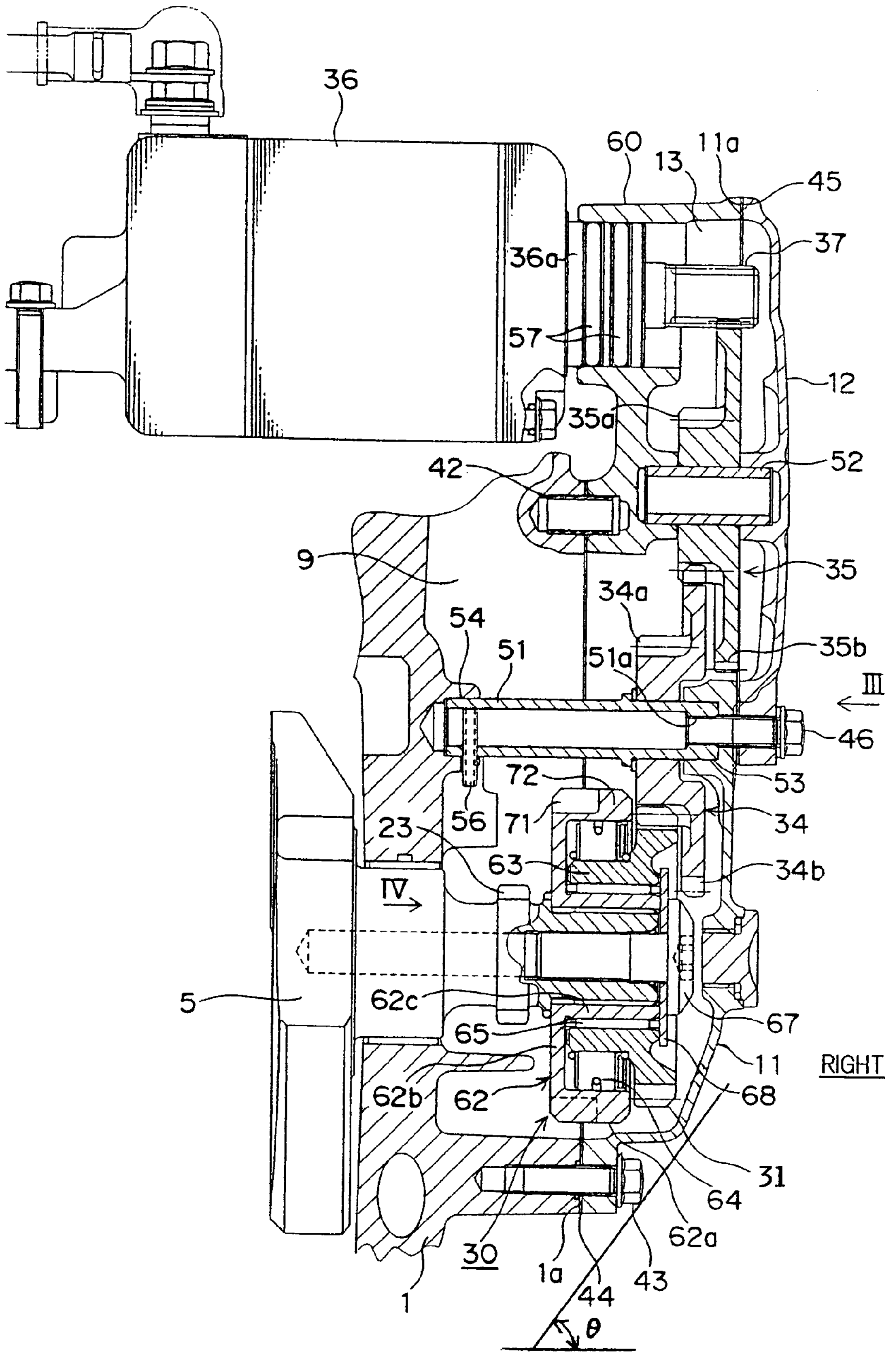
FIG. 2 is an enlarged vertical sectional view (namely, a sectional view taken on a line corresponding with II-II in FIG. 3) of a starter mechanism of the engine shown in FIG. 1.

FIG. 2 is an enlarged vertical sectional view of the starter mechanism 10 of the engine shown in FIG. 1. As shown in the figure, the first cover 11 is fixed to a mating surface 1*a* of the one side of the crankcase 1 with a plurality of bolts 43 through a gasket 44, in a state in which the first cover 11 and the mating surface 1*a* are aligned with each other by a dowel pin 42. The second cover 12 is fixed to a mating surface 11*a* of the first cover 11 with a plurality of bolts 46 through a gasket 45, in a state in which the second cover 12 and the mating surface 11*a* are aligned with each other by a second idler shaft 52 for supporting the second idler gear 35. One of the bolts 46 is screwed into an internal thread 51*a* formed inside a first idler shaft 51 for supporting a first idler gear 34, in which a right end of the first idler shaft 51 engages with a concave part 53 formed on the first cover 11. The first cover 11 and the second cover 12 are sandwiched together between the right end of the first idler shaft 51 and a head part of the bolt 46 in the direction of right and left (namely, in the crankshaft longitudinal direction), thereby enhancing a sealability on the mating surface between the first and second covers 11, 12. Meanwhile, a left end of the first idler shaft 51 extends through the cam-chain chamber 9 and engages fixedly with a concave part 54 formed on a right wall of the crankcase 1. The first idler shaft 51 is fixed to the crankcase 1 so as not to move in a direction of rotation and length of the first idler shaft 51, with a lock pin 56 extending inside the shaft 51 radially.

A small diametric part 36*a*, as an output side, of the starter motor 36 engages with a boss part 60 of the first cover 11, through an O-ring 57. The second idler gear 35 has a small diameter gear 35*a* and a large diameter gear 35*b* integrally. The second idler gear 35 is rotatably supported on the second idler shaft 52. The large diameter gear 35*b* meshes with an output pinion gear 37 of the starter motor 36. The first idler gear 34 also has a small diameter gear 34*a* and a large diameter gear 34*b* integrally. The first idler gear 34 is rotatably supported on the first idler shaft 51. The large diameter gear 34*b* meshes with the small diameter gear 35*a* of the second idler gear 35, and the small diameter gear 34*a* meshes with the starter gear 31. As shown in FIG. 2, the small diameter gear 34*a* and the large diameter gear 34*b* of the first idler gear 34, and the small diameter gear 35*a* and the large diameter gear 35*b* of the second idler gear 35 are formed adjacent to each other, respectively, in the crankshaft longitudinal direction. In other words, the small diameter gear 34*a* and the large diameter gear 34*b*, and the small diameter gear 35*a*' and the large diameter gear 35*b* are arranged with no substantial gap therebetween, respectively, in the crankshaft longitudinal direction. With this arrangement, the total length of the first and second idler gears 34, 35 becomes small in the crankshaft longitudinal direction, and the gears 34, 35 become light in weight.

The one-way clutch 30 which is mounted on the right side of the crankshaft 5, has a clutch outer member 62 which is cylindrical in shape and has a bottom, a clutch inner member 63 which is cylindrical in shape, and a clutch member (clutch engagement member) 64 such as a sprag.

The clutch outer member 62 has an end wall part 62*b* as the bottom which is disk-shaped, an outer peripheral wall 62*a* which extends rightward from an outer periphery of the end wall part 62*b* to be cylindrical in shape, and an inner boss part 62*c* which extends rightward from an inner periphery of the end wall part 62*b* to be cylindrical in shape, integrally. The clutch outer member 62 is located on the right side of the sprocket 23 (namely, on the outer side in the crankshaft longitudinal direction), in which the inner boss part 62*c* spline-engages with the crankshaft 5 such that the inner boss part 62*c* always rotates together with the crankshaft 5.

The clutch inner member 63 is opposed to an inner surface of the outer peripheral wall 62*a* of the clutch outer member 62 with a radially predetermined gap between an outer surface of the clutch inner member 63 and the inner surface of the clutch outer member 62, in which an inner peripheral surface of the clutch inner member 63 rotatably engages with an outer peripheral surface of the inner boss part 62*c* through a needle bearing 65.

The clutch member 64 is mounted between the outer surface of the clutch inner member 63 and the inner surface of the outer peripheral wall 62*a* of the clutch outer member 62. The clutch member 64 opens radially when the clutch inner member 63 rotates in a direction of a positive rotation of the engine, such that the clutch outer member 62 and the clutch inner member 63 are connected to each other. Namely, when the engine is started, a driving power for starting the engine in the direction of the positive rotation of the engine is transmitted from the clutch inner member 63 to the clutch outer member 62 (namely, to the crankshaft 5) only. The clutch inner member 63, and the inner boss part 62*c* of the clutch outer member 62, are locked to the crankshaft 5 with a retaining bolt 67 which is screwed into the right end of the crankshaft 5 through a retaining washer 68 such that the clutch outer member 62 and the clutch inner member 63 are immovable with respect to the crankshaft 5 in the crankshaft longitudinal direction.

The right end of the clutch inner member 63 extends beyond the right end of the outer peripheral wall 62*a* (namely, extends towards the outer part of the crankshaft 5), and the aforementioned starter gear 31 is integrally formed with the right end of the clutch inner member 63. Namely, the starter gear 31 is arranged on the right side of the clutch outer member 62, as shown in FIG. 2.

Figure 3:
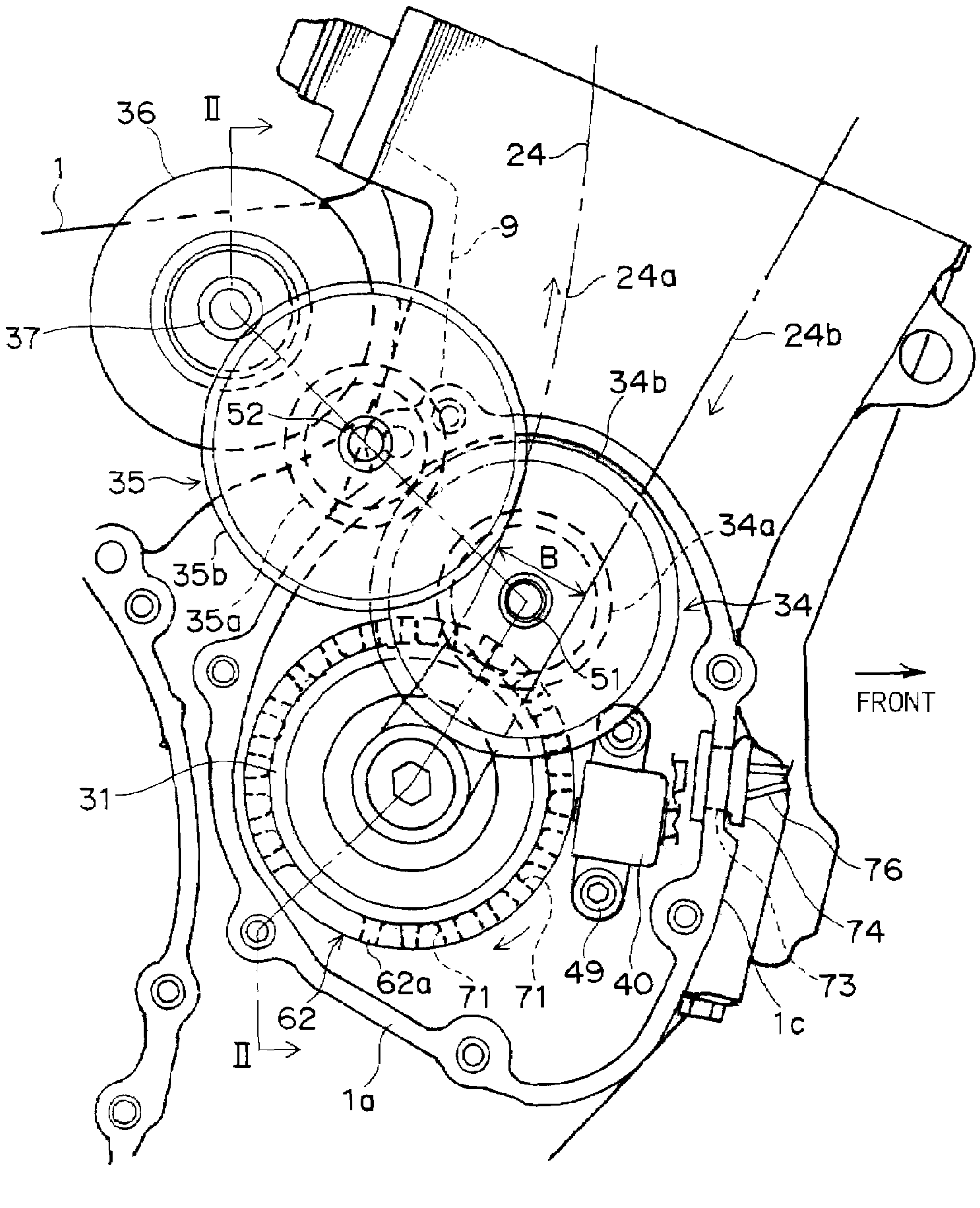
FIG. 3 is a view shown in the direction of an arrow III in FIG. 2, in which the starter mechanism is shown in a state in which covers for the starter mechanism are removed therefrom.

FIG. 3 is a right side view of the crankcase 1 shown in a state in which the first and second covers 11, 12 are removed therefrom. As shown therein, the starter motor 36 is positioned adjacent to the cam-chain chamber 9 of the crankcase 1. The first idler shaft 51 is positioned at a location between rear and front parts 24*a*, 24*b* of the cam-chain 24 as shown in the figure, and more specifically, the shaft 51 is positioned substantially at a center of a distance B between the rear and front parts 24*a*, 24*b*.

As shown in FIG. 2, as a signal output part of the signal detector for detecting the ignition signals, a plurality of teeth 71 (hereinafter, referred to as “signal output teeth”) is formed on an outer peripheral surface of the outer peripheral wall 62*a* by cutting. Each of the signal output teeth 71 is formed so as to extend from the left edge (namely, an inner edge in the crankshaft longitudinal direction) of the outer peripheral wall 62*a* to around a middle part thereof in the crankshaft longitudinal direction. The right half part of the outer peripheral wall 62*a* constituting the right open end of the clutch outer member 62, is formed thicker than the thickness of a bottom wall of the signal output teeth 71, as an annular reinforced part 72. Incidentally, the process for forming the signal output teeth 71 is not limited to the cutting as aforementioned. Alternatively, the signal output teeth 71 can be made by die machining or cold forging.

Figure 4:
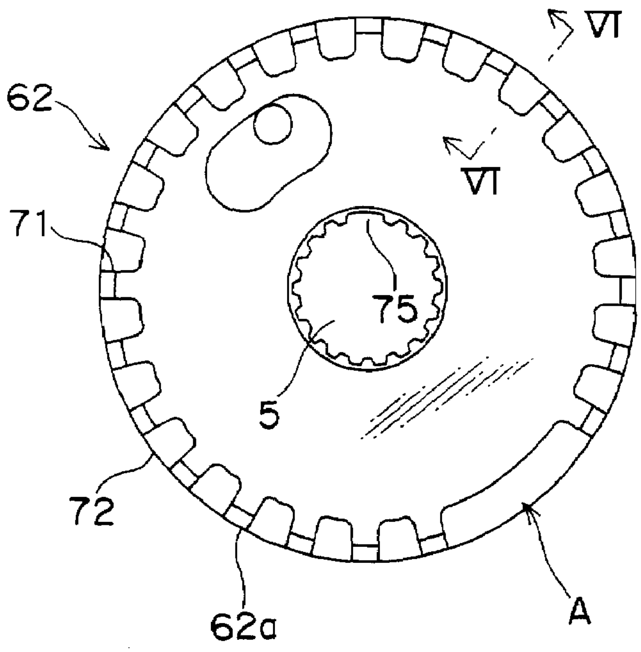
FIG. 4 is a view shown in the direction of an arrow IV in FIG. 2, in which a clutch outer member is shown.

FIG. 4 is a left side view of the clutch outer member 62 (namely, a view shown in the direction of an arrow IV in FIG. 2). As shown in the figure, the plurality of signal output teeth 71 (for example, twenty-four teeth) is formed circumferentially at an equal interval on the clutch outer member 62. In the figure, a reference character “A” points to a missing tooth (corresponding to two teeth), which can be used as a reference position for the pulse signals. By the way, the clutch outer member 62 has a spline on an inner surface thereof for spline-engaging the clutch outer member 62 with the crankshaft 5, and the spline has a missing tooth 75, which is used for aligning the angle of the crank upon mounting the clutch outer member 62 onto the crankshaft 5.

Figure 6:
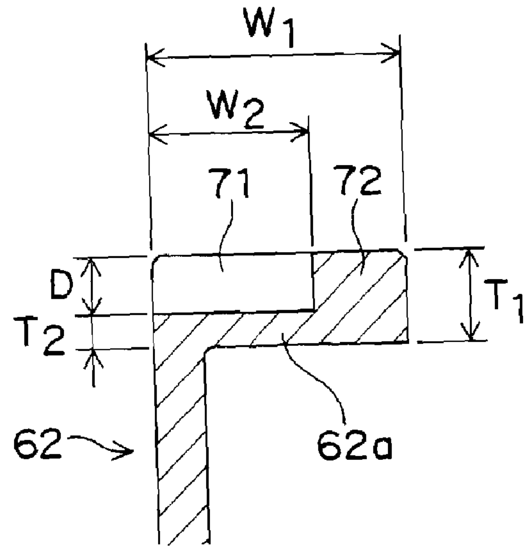
FIG. 6 is an enlarged sectional view taken on a line corresponding with VI-VI in FIG. 4.

FIG. 6 is an enlarged sectional view taken on a line corresponding with VI-VI in FIG. 4. The signal output tooth 71 has a tooth height (or tooth depth) “D” which is slightly larger than a half of the wall thickness “T1” of the outer peripheral wall 62*a*. The signal output tooth 71 has a top peripheral surface which is formed on the same level surface (namely, the same outside diameter) as that of the annular reinforced part 72. Namely, the thickness of the annular reinforced part 72 is greater than the thickness T2 of the bottom wall of the signal output tooth 71, and is equal to the thickness T1 of the outer peripheral wall 62*a*.

Figure 5:
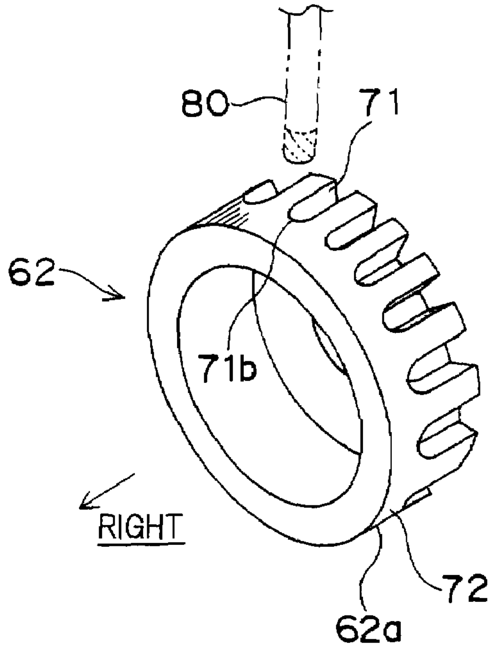
FIG. 5 is a perspective view of the clutch outer member shown in FIG. 4.

FIG. 5 is a perspective view of the clutch outer member 62 shown in FIG. 4. As shown in the figure, an edge surface 71*b* of an end portion (namely, the right end) of the signal output tooth 71 is formed semi-circular. The signal output tooth 71 is formed by cutting as aforementioned. In this embodiment, the tooth 71 is made by an end mill 80 that is positioned at a predetermined location radially relative to the outer peripheral wall 62*a* of the clutch outer member 62 and then moved with respect to the outer peripheral wall 62*a* in the crankshaft longitudinal direction. By forming the edge surface 71*b* of the signal output tooth 71 as a semi-circle in shape, stress concentration at the end portion of the signal output tooth 71 is prevented.

As shown in FIG. 3, the sensor 40 is arranged in front of the clutch outer member 62, and the sensor 40 is opposed to the signal output teeth 71 of the outer peripheral wall 62*a* with a small gap therebetween. The sensor 40 is fixed to the right wall of the crankcase 1 with bolts 49. A pair of wire leads 76 connected to the sensor 40 extends outside through a through-hole (or cutout) 73 formed in a starter chamber forming wall 1*c* of the crankcase 1. In order to seal the wire leads 76 against the through-hole 73, a rubber packing 74 in a form of grommet is employed therebetween, by which the wire leads 76 are supported.

With reference to FIG. 2, when the starter motor 36 is actuated in order to start the engine, the driving power of the starter motor 36 is transmitted from the output pinion gear 37 of the motor 36 to the crankshaft 5 of the engine, through the large diameter gear 35*b* of the second idler gear 35, the small diameter gear 35*a* of the second idler gear 35, the large diameter gear 34*b* of the first idler gear 34, the small diameter gear 34*a* of the first idler gear 34, the starter gear 31, the clutch inner member 63, the clutch member 64, and the clutch outer member 62, successively, in this order.

While the engine is working, the sensor 40 outputs pulse signals by sensing positions of the signal output teeth 71 on the outer peripheral wall 62*a* which rotates along with the crankshaft 5. The pulse signals are transmitted to a controller through the wire leads 76, and the pulse signals are processed by the controller in order to control the ignition timing for each cylinder of the engine.

Although the signal detector in the embodiment is used for the purpose of detecting the ignition signals, the pulse signals from the signal detector can be used for another purpose such as fuel injection signals by modifying the clutch outer member 62 such that the signal output teeth 71 have a different shape (or profile) and arrangement (or configuration). It is also possible to use the same for another purpose such as to detect the compression stroke and/or expansion stroke of the engine.

As shown in FIG. 2, the clutch outer member 62 of the one-way clutch 30 of the starter 10 has the signal output teeth 71 as a component for outputting the pulse signals for the ignition signals, and therefore there is no need to arrange an exclusive member (or separate member) used only for outputting the pulse signals for the ignition as is the case for like the conventional pulser rotor. Thereby, the total number of parts or components for the signal detector can be reduced, the crankshaft 5 can be reduced in length and weight, the crankcase 1 can be reduced in dimension in the crankshaft longitudinal direction, and the bank angle θ of the two-wheeled motor vehicle can be made larger.

The signal output teeth 71 are formed on the outer peripheral wall 62*a* which is cylindrical in shape. Therefore, each of the signal output teeth 71 can be made wider in the crankshaft longitudinal direction, in comparison with the conventional pulse rotor which is disk-shaped. Thereby, the performance for detecting the ignition signals is enhanced. Namely, with the construction, failure in detecting the signal output teeth 71 by the sensor 40 is effectively prevented.

As shown in FIG. 2, the outer peripheral wall 62*a* of the clutch outer member 62 has the annular reinforced part 72 which is annular and thicker than the bottom wall of the signal output tooth 71. Thereby, when load from the clutch member 64 is exerted upon the outer peripheral wall 62*a* from its radially inner part upon engagement of the clutch, radially outward distortion of the outer peripheral wall 62*a* is prevented, and therefore the performance of the one-way clutch is maintained.

The annular reinforced part 72 is formed on the outer peripheral wall 62*a* on the side of the open end of the clutch outer member 62. With this construction, a part of the outer peripheral wall 62*a* which is most likely to be distorted by a load exerted radially outwardly from the clutch member 64, is reinforced effectively. Namely, thereby, the distortion of the outer peripheral wall 62*a* is prevented.

The sensor 40 is mounted on the crankcase 1 along with the rubber packing 74 which supports the wire leads 76. According to this construction, in comparison with those members being mounted separately on the first cover 11 and the crankcase 1 for example, the wire leads 76 are easy to handle and arrange when the first cover 11 is attached to, or removed from, the crankcase 1. Therefore, with this construction, the assemblage and maintenance of the signal detector becomes easy.

Figure 7:
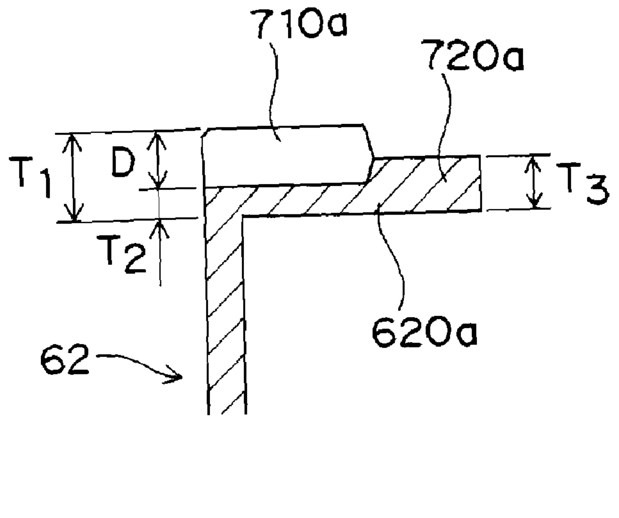
FIG. 7 is an enlarged sectional view similar to FIG. 6, in which a signal output tooth and annular reinforced part according to a modification is shown.

FIG. 7 is a view showing a signal output tooth 710*a* formed on an outer peripheral wall 620*a* of the clutch outer member 62, according to a modification. In the modification, the outer peripheral wall 620*a* is formed such that the outer diameter of an annular reinforced part 720*a* on the side of the open end of the clutch outer member 62 is smaller than that of a signal output tooth 710*a*. In the construction, the thickness T3 of the annular reinforced part 720*a* is smaller than that of the thickness T1 of the outer peripheral wall 620*a*, and the thickness T3 is greater than that of the thickness T2 of the bottom wall of the signal output tooth 710*a*.

Figure 8:
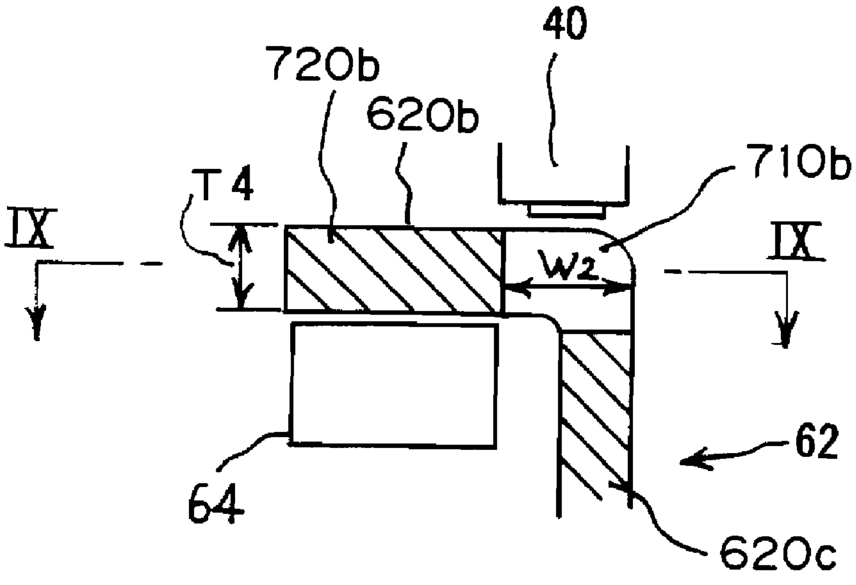
FIG. 8 is an enlarged sectional view similar to FIG. 6, in which a signal output tooth and annular reinforced part according to another modification is shown.
Figure 9:
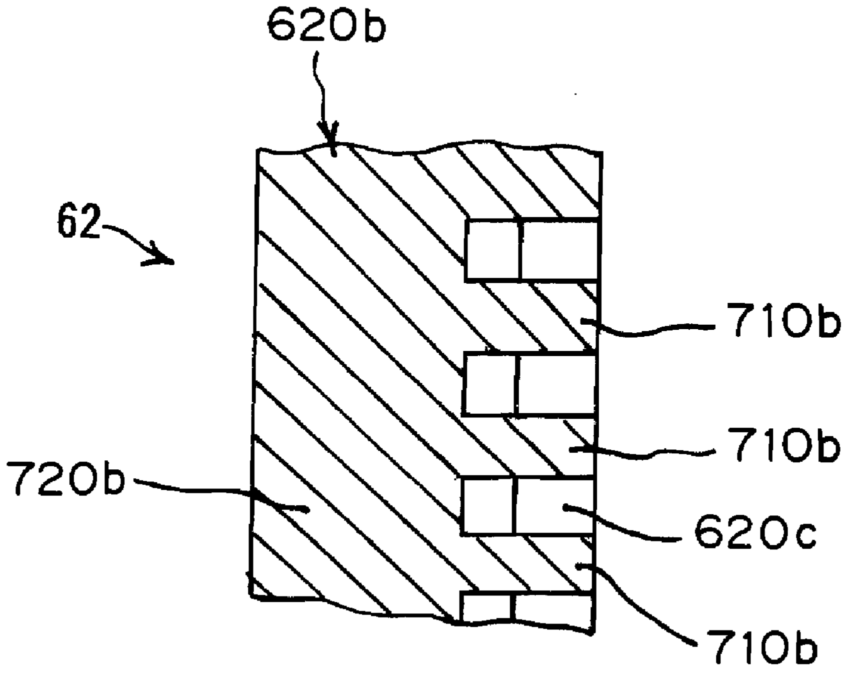
FIG. 9 is a development sectional view taken on a line corresponding with IX-IX in FIG. 8.
Figure 10:
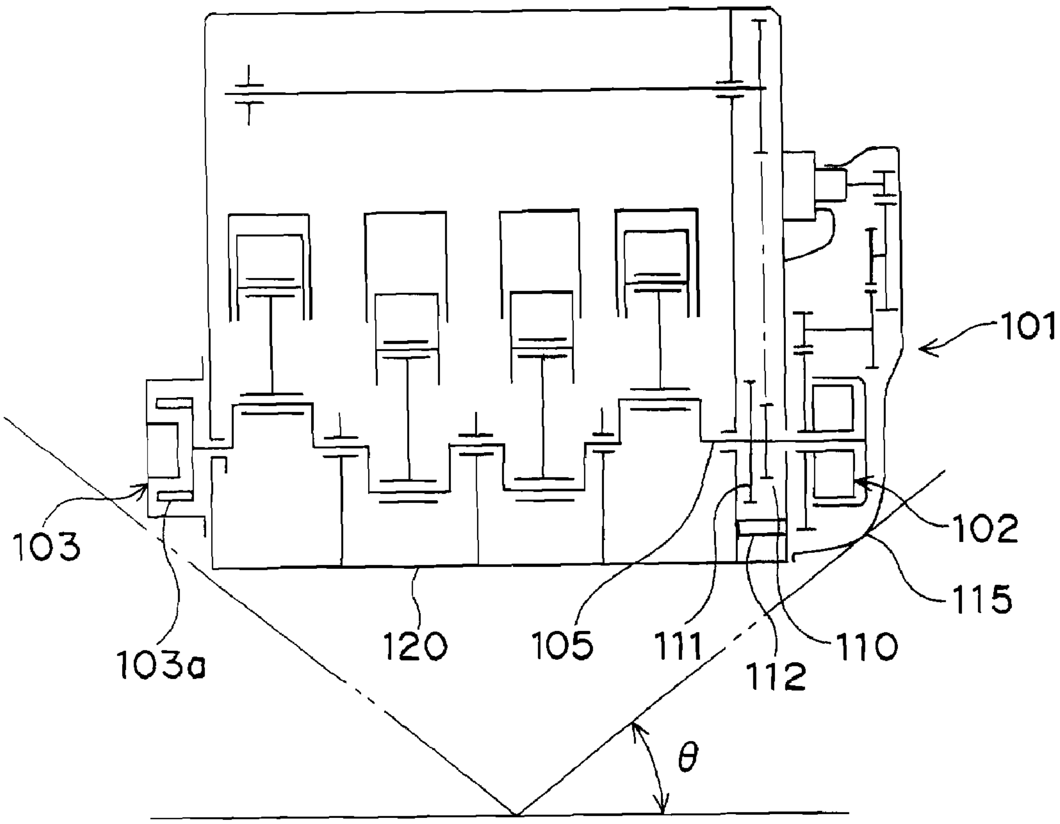
Fig.10 PRIOR ART
FIG. 10 is a vertical sectional view of a prior art engine for a two-wheeled motor vehicle.

FIGS. 8 and 9 are views showing signal output teeth 710*b* formed on an outer peripheral wall 620*b* of the clutch outer member 62, according to another modification. In this modification, a part of the bottom of the signal output tooth 710*b* is formed as a through-hole which is penetrated through the outer peripheral wall 620*b*.

As shown in the figures, the signal output teeth 710*b* are formed on a corner on the side of an end wall part 620*c* of the outer peripheral wall 620*b* of the clutch outer member 62, and the outer peripheral wall 620*b* on the side of the open end of the clutch outer member 62, with respect to the signal output tooth 710*b*, is formed as an annular reinforced part 720*b*. The sensor 40 is positioned radially outside the signal output tooth 710*b*, so as to be opposed to the signal output tooth 710*b*. The region "W2" of the signal output tooth 710*b* in the crankshaft longitudinal direction, is set so as not to overlap the region of the clutch member 64 in the crankshaft longitudinal direction.

As aforementioned, the bottom of the signal output tooth 710*b* is formed as the through-hole partially which is penetrated through the outer peripheral wall 620*b*. Therefore, the thickness of the part of the bottom of the signal output tooth 710*b* is 0 mm. According to this construction, the thickness T4 of the annular reinforced part 720*b*, is greater than the thickness (namely, 0 mm) of the part of the bottom of the signal output tooth 710*b*.

The shapes and/or constructions of the signal output teeth as a signal output part, are not limited to those according to the embodiment and modifications as explained above. It is alternatively possible to adopt any shape and/or construction of the signal output teeth formed such that the outer peripheral wall of the clutch outer member 62 has a continuous concavity and convexity which can be detected by the sensor 40. More specifically, for example, such a continuous concavity and convexity can be in a form of a rounded peak as its outer peripheral part and a trough as its inner peripheral part which are formed alternately.

The present invention preferably applies to the two-wheeled motor vehicle. However, it goes without saying that the present invention can apply to another type of vehicle.

According to the embodiment shown in FIGS. 1 and 2, the sprocket 23 for the cam-chain 24 is mounted on the crankshaft 5, as a rotation member for driving the cam. Alternatively, the present invention can also apply to the engine of a type in which a common mesh gear is employed.

According to the aforementioned embodiment, both of the sensor 40 and the rubber packing 74 supporting the wire leads 76 are accommodated inside the crankcase 1. Alternatively, it is also possible to house both the members 40, 74 inside the first cover 11 for the starter 10.

Although the present invention has been fully described in connection with the preferred embodiment thereof with reference to the accompanying drawings, it is to be noted that various other changes and modifications are also apparent to those skilled in the art. Such changes and modifications are to be understood as included within the scope of the present invention as defined by the appended claims unless they depart therefrom.

What is claimed is:

1. A signal detector arrangement for a vehicle engine having a starter mechanism and a crankshaft with first and second ends, said signal detector arrangement comprising:

a one-way clutch arranged to be mounted on one of the first and second ends of the crankshaft for disengageably coupling the starter mechanism with the crankshaft; and a sensor configured to detect signals;

wherein said one-way clutch includes a clutch inner member, a clutch outer member, and a clutch engagement member disengageably engageable between said clutch inner member and said clutch outer member so as to disengageably couple said clutch outer member for rotation with said clutch inner member;

wherein said clutch outer member comprises a cylindrical outer wall having an outer surface with at least one concavity and at least one convexity so as to constitute a signal output part to be detected by said sensor;

wherein said cylindrical outer wall of said clutch outer member further comprises an annular reinforcing part that is thicker than any radially bottom wall forming any radially bottom surface of said at least one concavity; and wherein said sensor is disposed radially outside said cylindrical outer wall of said clutch outer member at a position so as to radially oppose said at least one concavity and said at least one convexity upon rotation of said clutch outer member.

2. The signal detector arrangement as claimed in claim 1, wherein said clutch outer member further comprises an axial end wall at a first axial end of said cylindrical outer wall; and said annular reinforcing part constitutes a part of said cylindrical outer wall at a second axial end of said cylindrical outer wall axially opposite said first axial end thereof.

3. The signal detector arrangement as claimed in claim 2, wherein said at least one concavity and said at least one convexity are formed by signal output teeth formed as part of said cylindrical outer wall of said clutch outer member.

4. The signal detector arrangement as claimed in claim 3, wherein said cylindrical outer wall of said clutch outer member has a thickness at an axial part thereof at which said signal output teeth are formed that is equal to a thickness at an axial part thereof at which said annular reinforcing part is formed, such that a radially outer surface of said signal output teeth is flush with a radially outer surface of said annular reinforcing part; and a depth of each of said signal output teeth is larger than half of a radial thickness of said annular reinforcing part of said cylindrical outer wall.

5. The signal detector arrangement as claimed in claim 3, wherein said cylindrical outer wall of said clutch outer member has a thickness at an axial part thereof at which said signal output teeth are formed that is greater than a thickness at an axial part thereof at which said annular reinforcing part is formed, such that a radially outer surface of said signal output teeth is disposed radially outwardly of a radially outer surface of said annular reinforcing part; and a depth of each of said signal output teeth is larger than half of a radial thickness of said annular reinforcing part of said cylindrical outer wall.

6. The signal detector arrangement as claimed in claim 3, wherein said signal output teeth are formed at said first axial end of said cylindrical outer wall, with said at least one convexity being constituted by said signal output teeth, and said at least one concavity being constituted by a through-holes penetrating radially through said cylindrical outer wall between said signal output teeth.

7. The signal detector arrangement as claimed in claim 2, wherein said cylindrical outer wall of said clutch outer member has a thickness at an axial part thereof at which said at least one convexity and said at least one concavity are formed that is equal to a thickness at an axial part thereof at which said annular reinforcing part is formed, such that a radially outer surface of said at least one convexity is flush with a radially outer surface of said annular reinforcing part; and a depth of said at least one concavity is larger than half of a radial thickness of said annular reinforcing part of said cylindrical outer wall.

8. The signal detector arrangement as claimed in claim 2, wherein said cylindrical outer wall of said clutch outer member has a thickness at an axial part thereof at which said at least one convexity and said at least one concavity are formed that is greater than a thickness at an axial part thereof at which said annular reinforcing part is formed, such that a radially outer surface of said at least one convexity is disposed radially outwardly of a radially outer surface of said annular reinforcing part; and a depth of said at least one concavity is larger than half of a radial thickness of said annular reinforcing part of said cylindrical outer wall.

9. The signal detector arrangement as claimed in claim 2, wherein said at least one convexity and said at least one concavity are formed at said first axial end of said cylindrical outer wall, with said at least one concavity being constituted by a through-hole penetrating radially through said cylindrical outer wall.

10. The signal detector arrangement as claimed in claim 1, wherein said at least one concavity and said at least one convexity are formed by teeth formed as part of said cylindrical outer wall of said clutch outer member.

11. The signal detector arrangement as claimed in claim 1, further comprising an engine crankcase configured to encase the crankshaft; and a wire lead supporter configured to support a wire lead for said sensor;

wherein said sensor and said wire lead supporter are mounted on said engine crankcase.

12. The signal detector arrangement as claimed in claim 1, wherein said clutch inner member is disposed radially within said cylindrical outer wall of said clutch outer member; and said clutch engagement member is disposed radially between said clutch inner member and said cylindrical outer wall of said clutch outer member.

* * * * *